United States Patent [19]

Fawcett et al.

[11] Patent Number: 4,489,557
[45] Date of Patent: Dec. 25, 1984

[54] TURBOCHARGER FOR INTERNAL COMBUSTION ENGINES

[75] Inventors: Sherwood L. Fawcett, Columbus; James N. Anno, Cincinnati, both of Ohio

[73] Assignee: Battelle Development Corporation, Columbus, Ohio

[21] Appl. No.: 123,543

[22] Filed: Feb. 22, 1980

[51] Int. Cl.³ ............................................ F02B 37/00
[52] U.S. Cl. ..................................... 60/605; 418/33
[58] Field of Search ..................... 60/605; 418/33, 35

[56] References Cited

U.S. PATENT DOCUMENTS 3,859,789 1/1975 Fawcett et al. ................ 418/33 X

*Primary Examiner*—Michael Koczo
*Attorney, Agent, or Firm*—Thomas H. Murray; Clifford A. Poff

[57] ABSTRACT

A turbocharger for internal combustion engines comprising a unidirectional energy converter having a closed, continuous loop passageway containing a plurality of freely-movable, unrestrained bodies which travel around the passageway in one direction only. In one region of the passageway, successive bodies are propelled in one direction around the passageway by exhaust gases from an internal combustion engine. In another region of the passageway, the kinetic energy of the propelled bodies is used to compress a gas, which can be mixed with fuel. This compressed gas is then forced into the cylinders of the internal combustion engine; whereupon the bodies are again propelled around the passageway to repeat the cycle.

7 Claims, 2 Drawing Figures

TURBOCHARGER FOR INTERNAL COMBUSTION ENGINES

BACKGROUND OF THE INVENTION

As is known, the purpose of supercharging or turbocharging an internal combustion engine is to increase its horsepower output without increasing its speed. This is accomplished by increasing the mass flow rate over a naturally aspirated engine by pressurizing the intake gas. Supercharging uses crankshaft power to drive a compressor to accomplish this task; whereas turbocharging uses the energy of the exhaust gases, via a turbine, to drive a compressor to accomplish the same result. Since a supercharger is parasitic to engine performance (a gear-driven supercharger can use more than 20% of the total engine power at sea level), the turbocharger is considered superior for commercial road vehicles.

In the operation of a typical turbocharger, exhaust gases from the engine drive a turbine which, in turn, drives a compressor. Fresh air is taken from the outdoors, cleaned and mixed with the gasoline in the carburetor. The gasoline/air mixture is then compressed in the compressor and fed to the cylinders for combustion. In fuel-injection systems (e.g., diesel engines), on the other hand, the fuel is injected into the compressed air. For typical small passenger cars, the boost pressure is only about 9 pounds per square inch, but this is sufficient to double the peak horsepower.

Turbochargers currently in use suffer at least four main problems. First, when accelerating from a condition where the engine is idling with the vehicle at rest, the response is sluggish. This sluggish response has been termed "turbolag". What is needed is instantaneous response to full boost. Secondly, current turbochargers operate at some boost at all throttle conditions. What is needed is no boost at partial throttle conditions, and instantaneous boost at wide-open throttle, constant for all engine speeds. Thirdly, current turbochargers are lubricated with the engine oil. Dirt in the oil causes lubrication problems at the high-speed operation of the turbocharger (e.g., 100,000 RPM). Finally, current turbochargers are expensive. Conversion kits for non-turbocharged vehicles presently cost in excess of $1000.00.

SUMMARY OF THE INVENTION

In accordance with the present invention, a new and improved turbocharger is provided which overcomes many of the aforesaid disadvantages of prior art turbochargers. The turbocharger of the invention is low-cost, provides for instantaneous response, and is not subject to dirt in the engine oil. Actually, the invention is not truly a turbocharger in that it does not employ a turbine; but it is somewhat similar to a turbocharger in that it operates on exhaust gases. The invention employs, as a basic component, a unidirectional energy converter such as that shown and described in U.S. Pat. No. 3,859,789, issued Jan. 14, 1975. High-temperature pressurized exhaust gas from an internal combustion engine is fed into the unidirectional energy converter where the gas energy is initially converted to kinetic energy of pistons. Once expanded, the exhaust gas is discharged from the converter and a fresh air/fuel mixture is taken into the compressor region, compressed to the desired boost pressure by the energy of the pistons, and discharged to the cylinders of the engine.

In a specific embodiment of the invention, there is provided a continuous, closed-loop passageway containing a plurality of freely-movable bodies. Means are provided in one region of the passageway for propelling the bodies in one direction around the passageway with the use of exhaust gases from an internal combustion engine. In another region of the passageway beyond the first region, means are provided for converting at least a portion of the kinetic energy of the propelled bodies into energy in the form of a compressed gas. This compressed gas is then conducted to the cylinders of the internal combustion engine with or without the addition of fuel where it is further compressed by movement of the pistons within the cylinders.

The above and other objects and features of the invention will become apparent from the following detailed description taken in connection with the accompanying drawings which form a part of this specification, and in which.

Figure 1:
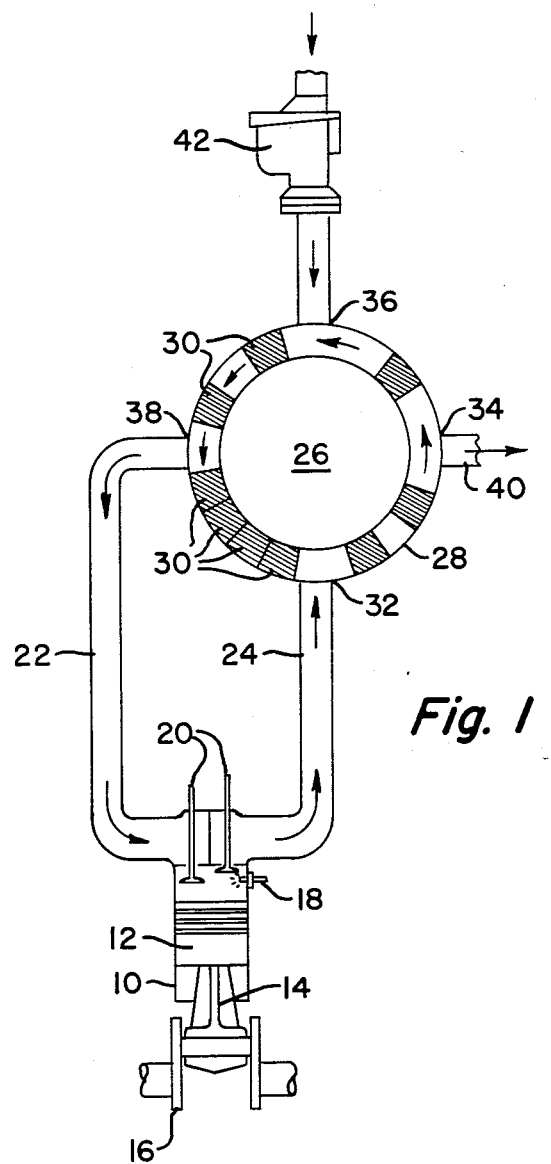
FIG. 1 is a schematic illustration of one embodiment of the invention.

With reference now to the drawings, and particularly to FIG. 1, a cylinder 10 of an internal combustion engine is shown having a piston 12 reciprocable therein and connected through piston rod 14 to a crankshaft 16. It will be assumed, for purposes of illustration, that the engine is a gasoline engine which operates on the Otto cycle and is provided with a sparkplug 18. Conventional valves 20 interconnect the top of the cylinder 10 with an intake manifold 22 and an exhaust manifold 24, as is conventional.

Figure 2:
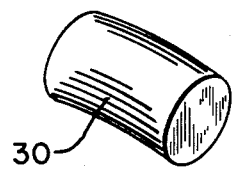
FIG. 2 is a perspective view of the freely-movable bodies utilized in the unidirectional energy converter of FIG. 1.

Both the intake and exhaust manifolds 22 and 24 are connected to a unidirectional energy converter, generally indicated by the reference numeral 26. The energy converter comprises a continuous, closed-loop circular passageway 28 (schematically shown in cross section) having a plurality of freely-movable bodies or pistons 30 therein. The pistons 30 may, for example, appear as in FIG. 2 and comprise cylinderical metal plugs which have a radius of curvature corresponding to the radius of curvature of the closed-loop passageway 28. Alternatively, the pistons 30 may comprise spheres or other geometries conforming to the passageway. The tolerance or clearance between the surfaces of the pistons 30 and the inside walls of the closed-loop passageway 28 is such as to permit the pistons to move freely through the passageway. However, fluid flow past the pistons within the passageway is substantially prevented. Additionally, the pistons may be equipped with conventional piston rings. The continuous, closed-loop passageway 28 is provided with four ports 32, 34, 36 and 38 spaced around the passageway 28 at intervals of about 90°. Port 32 is connected to the exhaust manifold 24 as shown; whereas port 38 is connected to the intake manifold 22. Port 34 is connected to an exhaust pipe 40 which discharges into the atmosphere; while port 36 is connected to the outlet side of a conventional carburetor 42.

The continuous, closed-loop passageway 28 is divided into regions or zones, the region between ports 32 and 34 comprising an expander section wherein exhaust gases entering port 32 cause succesive ones of the pistons 30 to be propelled around the passageway 28 in a counterclockwise direction as viewed in FIG. 1. That is, the hot exhaust gases from the engine enter the passageway 28 and expand adiabatically, imparting kinetic energy in the form of foward velocity to each piston 30 while the gas between successive ones of the pistons is reduced in temperature. As the pistons pass port 34, the cooler exhaust gases which have been adiabatically expanded exit to the atmosphere; while the pistons 30 continue on to the port 36 where they draw in a mixture of fuel and air from the carburetor 42. Between ports 36 and 38, the air/fuel mixture is compressed, the compressed gas exiting through port 38 to the intake manifold 22. Between ports 38 and 32, the pistons 30 in a thruster region move downwardly under gravity and in abutment to the point where they are again propelled in a counterclockwise direction by the exhaust gases to repeat the cycle. In the thruster region, the force of gravity acting on the pistons balances the forces around the passageway. Other means, such as a ratchet-type latch, can be used in the thruster region to prevent backward movement of the pistons under the influence of the entering exhaust gases. Thus, exhaust gases entering port 32 propel the pistons 30 around the closed-loop passageway 28 while the compressed mixture of fuel and air entering port 36 is compressed and exits through port 38 to the manifold 22 where it is forced into the cylinder 10 on the down stroke of the piston 12 in a conventional Otto cycle. It is, of course, also possible to utilize the turbocharger of the invention with a diesel engine, in which case fuel is injected into the air entering port 36 or fuel is injected directly into the cylinder 10 as is conventional. At high engine speeds and powers, the exhaust gas energy may be excessive to run the turbocharger. In this case, part of the waste gas must be bypassed by the use of a conventional "wastegate".

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Turbocharger apparatus for an internal combustion engine comprising a continuous, closed- loop passageway, a plurality of freely-movable bodies disposed within said passageway, means to introduce exhaust gases from said internal combustion engine into one region of the passageway for propelling said bodies in one direction around the passageway, means to introduce a gas into another region of the passageway for converting at least a portion of the kinetic energy of the propelled bodies into energy in the form of a compressed gas, and means for conducting said compressed gas to the cylinders of said internal combustion engine where it is further compressed by movement of pistons within the cylinders.

2. The turbocharger apparatus of claim 1 wherein said compressed gas comprises a mixture of air and fuel derived from a carburetor.

3. The turbocharger apparatus of claim 1 wherein said internal combustion engine is a diesel engine and said compressed gas comprises air.

4. The turbocharger apparatus of claim 1 wherein said passageway has four ports spaced around its periphery, one of said ports being connected to a source of exhaust gases under pressure from said internal combustion engine, a second of said ports permitting exhaust of said exhaust gases from the passageway after said bodies have been propelled, a third of said ports permitting gas to be drawn into said passageway for compression, and a fourth of said ports acting to convey compressed gas to the cylinders of said internal combustion engine.

5. Turbocharger apparatus for an internal combustion engine comprising a continuous, closed-loop passageway, a plurality of freely-movable bodies disposed within said passageway, first port means for introducing exhaust gases from said internal combustion engine into said passageway to thereby propel successive ones of the bodies in one direction around the passageway, second port means in the passageway spaced from the first port means in the direction of movement of said bodies for exhausting said exhaust gases from the passageway, third port means spaced from the second port means in the direction of movement of the bodies for introducing air into the passageway, and fourth port means intermediate the first and third port means connecting said passageway to the cylinders of said internal combustion engine.

6. The turbocharger apparatus of claim 5 wherein said third port means is connected to a device for mixing air with fuel.

7. The turbocharger apparatus of claim 5 wherein said bodies are in abutment in the region of said passageway between said fourth and first port means but are separated by gas pockets as they travel around the remainder of the passageway.

* * * * *